Dec. 30, 1941.  T. F. SPACKMAN  2,268,063
AUTOMOBILE HEATER
Filed Dec. 2, 1939
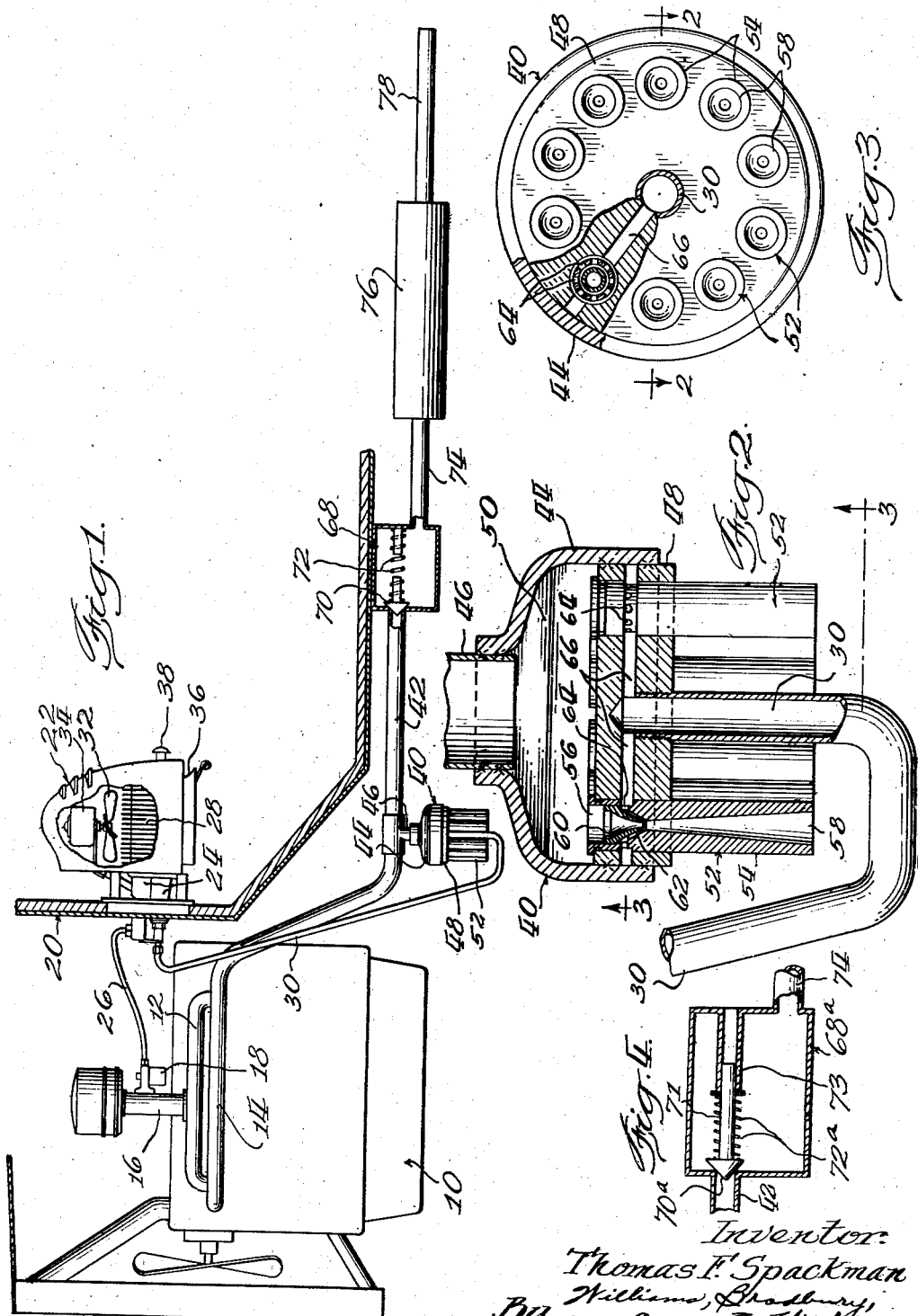
Inventor:
Thomas F. Spackman
By Williams, Bradbury,
McCalet & Hinkle
Attys Patented Dec. 30, 1941

2,268,063

UNITED STATES PATENT OFFICE 2,268,063

AUTOMOBILE HEATER

Thomas F. Spackman, Chicago, Ill., assignor to Stewart-Warner Corporation, Chicago, Ill., a corporation of Virginia Application December 2, 1939, Serial No. 307,205

5 Claims. (Cl. 237—12.3)

My invention relates to automobile heaters and is more particularly concerned with automobile heaters of the internal combustion type.

In automobile heaters of the internal combustion type the heater is ordinarily connected with the fuel tank of the automobile and with the intake manifold of the automobile engine. The suction in the intake manifold serves to draw a mixture of fuel and air into the combustion chamber of the heater and to cause the products of combustion created therein to pass through a heat exchange labyrinth in the heater. An electric fan blows air over the exterior of this heat exchange labyrinth and the air thus heated is discharged into the passenger compartment of the vehicle. The products of combustion of the heater pass from the labyrinth into the intake manifold of the engine.

This arrangement is objectionable in that the products of combustion discharged from the automobile heater tend to interfere with the operation of the automobile engine and cause uneven running thereof, particularly when idling. This disadvantage is more pronounced where the automobile engine is small and particularly where the intake manifold arrangement is such that all of the products of combustion of the automobile heater are discharged into less than the total number of engine cylinders. A further disadvantage of this arrangement of the automobile heater lies in the uneven operation of the heater as a result of variation in intake manifold vacuum.

An object of my invention is to overcome the foregoing disadvantages of automobile heaters of the internal combustion type.

Another object of my invention is to provide a more constant source of vacuum for the automobile heater.

Another object of my invention is to connect the automobile heater with the exhaust manifold in a manner providing the requisite vacuum for operation of the automobile heater.

Other objects and advantages of my invention will become apparent as the description proceeds.

In the drawing,

Figure 1 is a diagrammatic view showing a preferred embodiment of my invention;

Figure 2 is an enlarged detailed sectional view of a part of the mechanism and is taken on the line 2—2 of Figure 3;

Figure 3 is an irregular section taken on the line 3—3 of Figure 2; and

Figure 4 illustrates a modified form of valve chamber.

In Figure 1 I have indicated an automobile having an internal combustion engine 10 provided with an intake manifold 12 and an exhaust manifold 14. A carburetor 16 as attached to the intake manifold 12 and has the usual float bowl 18 for holding a quantity of fuel. It will be understood that the carburetor 16 is connected with the main fuel tank of the automobile in the conventional manner.

The automobile is illustrated as having a dash 20 on which is mounted the heater 22 of the internal combustion type. The heater 22 may be of the kind illustrated and described in the application of Henry J. De N. McCollum, Serial No. 61,213, filed January 28, 1936, and since heaters of this kind are now in common commercial use, it is unnecessary to describe this heater in detail herein. It will suffice to point out that this heater has a combustion chamber 24 receiving its fuel supply from the float bowl 18 by way of pipe 26 and that the products of combustion created in the combustion chamber 24 pass through the labyrinth type of heat exchanger 28 and thence into discharge pipe 30. A fan 32 driven by an electric motor 34 creates a flow of air over the heat exchanger 28 and the air heated thereby is discharged into the passenger compartment of the automobile through suitable flow-directing louvers 36. A suitable manual control 38 is provided for starting and stopping the heater.

The heater discharge pipe 30 leads to a suction-creating device 40 communicating with and preferably supported by an exhaust pipe 42 which is connected to the exhaust manifold 14. The suction-creating device 40 is illustrated more fully in Figures 2 and 3 which show this device on an enlarged scale as compared with Figure 1.

Referring particularly to Figure 2, it will be seen that this device 40 comprises a hood 44 attached to a short pipe 46 which in turn is in open communication with the exhaust pipe 42 and it will be understood that the pipe 46 may be one branch of a T-connection or any other suitable piece of piping for conveniently installing the device 40 in the exhaust system of a conventional automobile. The lower end of the hood 44 is closed by a circular block 48 in such manner that a chamber 50 is formed between the upper end of the block 48 and the inlet pipe 46 which admits exhaust gases to the chamber 50.

In the particular embodiment disclosed, the block 48 is bored to receive ten Venturi tubes 52 arranged in a circle. Each Venturi tube 52 comprises a tubular member 54 having an inlet 56 communicating with the chamber 50 and a flaring outlet 58 communicating with atmosphere. Each Venturi tube also includes a tubular throat member 60 providing a tapering passage through which the exhaust gases are discharged. The lower end of the throat member 60 is externally tapered and is closely adjacent to but spaced from a complementary tapered portion of the tubular member 54, thereby providing a narrow annular passage 62 communicating at its lower end with the throat of the Venturi tube.

The upper ends of the passages 62 communicate through ports 64 and radial ducts 66 with the end of the heater discharge pipe 30 where it is threaded or otherwise suitably connected to the block 48.

The outlet end of the exhaust pipe 42 is illustrated as connected to a valve chamber 68 preferably having a form such that this valve chamber may be readily inserted in the exhaust system of the conventional automobile. A valve 70 is located in the valve chamber and is yieldingly urged against the end of the pipe 42 by a spring 72. The valve chamber 68 is also connected to a pipe 74 leading to the usual exhaust muffler 76 having the conventional tail pipe 78.

In the operation of my invention the exhaust from the engine cylinders passes into the exhaust manifold 14 and thence to the exhaust pipe 42. The exhaust pipe 42 is in open communication with the chamber 50 whereas no exhaust gases can pass into the valve chamber 68 and muffler 76 until the pressure in the exhaust pipe 42 is sufficient to overcome the loading of the valve 70.

The exhaust gases passing into the chamber 50 are discharged to atmosphere through the Venturi tubes 52 and in passing through the restricted throats of these Venturi tubes, a suction is created at the throats of the Venturi tubes which is communicated by way of passages 62, ports 64, and ducts 66, to the heater discharge pipe 30. The result is that fuel is drawn into the heater through the pipe 26 and is mixed with air by a carbureting device to form a combustible mixture which is burned in the combustion chamber 24. The heated products of combustion created therein pass through the labyrinth heat exchanger 28 and give up their heat to the air circulated by the fan 32. The cooled products of combustion from the heater then flow through the pipe 30, ducts 66, ports 64, and passages 62, to the throats of the Venturi tubes where they mix with the exhaust gases passing through the Venturi tubes 52 and are discharged therewith.

Under all conditions of engine operation, the valve 70 functions to maintain sufficient pressure in the exhaust manifold 14, exhaust pipe 42, and chamber 50, to insure proper operation of the heater. When the automobile engine is operating under conditions other than idling, there is normally sufficient pressure in the exhaust manifold 14, exhaust pipe 42, and chamber 50, to provide adequate operation of the heater even if the valve 70 were omitted. I have found that a pressure of one and one-half to two inches of mercury in that part of the exhaust system connected with the suction device 40 is sufficient for proper heater operation and the loading of the valve 70 is preferably made only sufficient to maintain this pressure under all conditions of engine operation.

My experiments show that the slight additional pressure in the exhaust manifold which is imposed by the valve 70 does not interfere with running of the engine during idling or any other phase of its operation. However, if for any reason it should be desired to eliminate the effect of the valve 70 when the operation of the engine is such that sufficient pressure is maintained in the exhaust pipe 42 and chamber 50 without the valve 70, a modified form of valve chamber and valve arrangement such as is shown in Figure 4, can be substituted for the valve chamber and valve arrangement shown in Figure 1. In Figure 4 the valve 70a is urged against the outlet end of the pipe 42 by a spring 72a interposed between the head of the valve and the end of an open tubular cylinder 73 which forms a part of the valve chamber 68a. The valve 70a is attached to the end of a piston member 71, which slides in the cylinder 73 and guides the valve 70a. The cylinder 73 is so arranged that the end of the piston opposite the valve is exposed to atmospheric pressure. Exhaust gas pressure in the valve chamber 68a acts against the valve 70a and tends to compress the spring 72a against the atmospheric pressure acting against the back of the piston 71. When the pressure in the valve chamber 68a sufficiently exceeds atmospheric pressure to overcome the loading of the spring 72a, the valve 70a is maintained at its open position and will have no effect upon the flow of gases until the pressure in the valve chamber 68a falls sufficiently to allow the spring to move the valve 70a toward its closed position.

My experiments have further shown that the exhaust gases escaping to atmosphere through the Venturi tubes 52 do not create any objectionable noise but are effective under all conditions of engine operation to provide adequate vacuum for operation of the heater 22. My invention has also proved successful in overcoming the uneven engine operation sometimes resulting where the heater was connected to the intake manifold of the engine.

While I have illustrated and described only two forms of my invention, it is to be understood that my invention may assume numerous other forms and is not limited to the details illustrated herein.

I claim:

1. Heating means for an automobile having an internal combustion engine provided with an exhaust manifold, said heating means comprising a combustion chamber, suction-operated means for supplying a combustible mixture thereto, heat exchange means communicating with said combustion chamber and receiving the products of combustion therefrom, means comprising a back pressure valve for affording communication between said manifold and the atmosphere and constructed to open and allow exhaust gases to escape therethrough to the atmosphere when the pressure in the manifold reaches a predetermined value, for maintaining a predetermined pressure in said exhaust manifold under all conditions of engine operation, a plurality of Venturi tubes each having an inlet communicating with said manifold between said engine and said valve, an outlet communicating with the atmosphere, and a restricted throat, and means connecting said throats with said heat exchange means whereby exhaust gases passing through said Venturi tubes maintain a suction in said combustion chamber and heat exchange means.

2. In an internal combustion heater suitable for use in conjunction with an internal combustion engine and having a combustion chamber, suction-operated means for supplying said combustion chamber with combustible mixture, heat exchange means communicating with said combustion chamber and receiving the products of combustion therefrom; the combination of an engine exhaust manifold; a plurality of Venturi tubes each having an inlet communicating with said exhaust manifold, an outlet communicating with the atmosphere, and a restricted throat; means connecting said throats with said heat exchange means whereby the flow of exhaust gases through said Venturi tubes maintains a vacuum in said heat exchange means and combustion chamber; a duct connecting said manifold with the atmosphere and providing means for the escape of exhaust gases from said manifold; and a pressure controlled valve in said duct, said valve being constructed to open when the pressure in said manifold reaches a predetermined maximum value thereby allowing the escape of exhaust gases therefrom.

3. In an internal combustion heater suitable for use in conjunction with an internal combustion engine and having a combustion chamber, suction-operated means for supplying said combustion chamber with combustible mixture, and heat exchange means communicating with said combustion chamber and receiving the products of combustion therefrom; the combination of an engine exhaust manifold; a plurality of Venturi tubes each having an inlet communicating with said exhaust manifold, an outlet communicating with the atmosphere, and a restricted throat; means connecting said throats with said heat exchange means whereby the flow of exhaust gases through said Venturi tubes maintains a vacuum in said heat exchange means and combustion chamber; a passageway connected to said exhaust manifold and providing a means for the escape of exhaust gases therefrom to the atmosphere; a valve chamber in said passageway; and a spring operated valve in said chamber and closing against the inlet thereto, the spring tension closing said valve being so adjusted that said valve will open when the pressure in said exhaust manifold reaches a predetermined maximum.

4. In an internal combustion heater suitable for use in conjunction with an internal combustion engine and having a combustion chamber, suction-operated means for supplying said combustion chamber with a combustible mixture, heat exchange means communicating with said combustion chamber and receiving the products of combustion therefrom; the combination of an engine exhaust manifold; a plurality of Venturi tubes each having an inlet communicating with said exhaust manifold, an outlet communicating with the atmosphere, and a restricted throat; means connecting said throats with said heat exchange means whereby the flow of exhaust gases through said Venturi tubes maintains a partial vacuum in said heat exchange means and combustion chamber; a passageway connecting with said exhaust manifold and providing a means for the escape of exhaust gases therefrom; a valve chamber in said passageway; a valve in said chamber; a cylinder open at one end to the atmosphere; a piston operating in said cylinder and so connected with said valve that the pressure of the atmosphere will tend to close said valve; and resilient means to close said valve, said resilient means being so adjusted that the pressure of the exhaust gases acting against said valve will cause it to open when said pressure has reached a predetermined maximum value.

5. In an internal combustion heating system suitable for use in conjunction with an internal combustion engine and having a combustion chamber, suction-operated means for supplying said combustion chamber with combustible mixture, and heat exchange means communicating with said combustion chamber and receiving products of combustion therefrom, the combination of an engine exhaust manifold, a chamber, a duct connecting said chamber with said exhaust manifold, a plurality of Venturi tubes each having an inlet communicating with said chamber, a restricted throat and an outlet communicating with the atmosphere, a second chamber communicating with the throats of said Venturi tubes through passages generally inclined in the direction of flow through said Venturi tubes, a passage connecting said second chamber with said heat exchange means in such a manner that exhaust gases passing through said Venturi tubes maintain a partial vacuum in said combustion chamber, a duct connecting said manifold with the atmosphere, and a pressure controlled valve in said last named duct, said valve being so constructed that it will open and allow the escape of exhaust gases from said manifold to the atmosphere when the pressure in the said manifold reaches a predetermined value.

THOMAS F. SPACKMAN.